United States Patent Office 3,408,304
Patented Oct. 29, 1968

3,408,304
METHOD OF PREPARING AN ACTINIDE PEROXIDE SOL
Eugene J. Kosiancic, Lynchburg, Va., assignor to The Babcock & Wilcox Company, New York, N.Y., a corporation of New Jersey
No Drawing. Filed Nov. 8, 1966, Ser. No. 592,720
8 Claims. (Cl. 252—301.1)

ABSTRACT OF THE DISCLOSURE

In making plutonium oxide from spent nuclear fuel, an aqueous plutonium sol is made by first adding hydrogen peroxide to plutonium nitrate solution, thus precipitating plutonium peroxide, and then peptizing the washed and filtered precipitate.

---

This invention relates generally to a method of making nuclear fuel materials, especially oxide ceramic nuclear fuel materials such as plutonium oxide. More particularly, the invention relates to that portion of the method in which an aqueous sol of an actinide such as plutonium is made from an aqueous solution of the salt of the corresponding actinide.

Ceramic oxide nuclear fuel materials are now in common use in nuclear power reactors which generate steam or vapor with heat from the fission process. The fission process may employ such well known fissile materials as $U^{235}$, $U^{233}$, $Pu^{239}$ and the like. At least one of these fissile materials and at least one fertile material, such as $U^{238}$, are contained in a nuclear fuel component. Thus, when a fissile material undergoes fission while in proximate association with a fertile material it is possible to breed new fissile material by conversion of the fertile material. This conversion or so-called breeding involves neutron bombardment of the fertile material which, after successive Beta decay, yields the new fissile material. For example, $U^{238}$ (Uranium) under neutron bombardment yields $U^{239}$ which decays by Beta emission first to $Np^{239}$ (Neptunium) and then to $Pu^{239}$ (Plutonium). The latter is a fissile material, produced as aforesaid from fertile material, which can be recovered from the spent fuel and made into plutonium oxide for use with uranium oxide in new fuel pins.

The fabrication of fuel pins using recovered fissile material can be done in a number of ways, but one procedure will now be outlined for the sake of giving an example. The spent fuel is dissolved in aqueous nitric acid solution; the uranium and plutonium fuel materials are separated from fission products; the uranium and plutonium materials are separated from one another and their respective valences are adjusted as desired; the plutonium and uranium materials are made into oxide ceramic materials; and fuel pins are fabricated from the oxide ceramic materials.

The present invention is directed to the above-mentioned step prior to fuel pin fabrication of making oxide ceramic materials containing the recovered plutonium, which step further involves the making of an aqueous plutonium sol (colloidal suspension) by a procedure to be described in detail after first discussing the prior art procedure for making plutonium sol.

Prior art

One known method of making plutonium sol is described in a paper by R. G. Wymer and J. H. Cobbs of Oak Ridge National Laboratory, Oak Ridge, Tennessee, entitled: "Preparation, Coating, Evaluation, and Irradiation Testing of Sol-Gel Oxide Microspheres," further identified as Report ORNL TM-1720, September 1965.

As described in the cited paper, the making of an aqueous plutonium sol proceeds from a solution of plutonium nitrate, $Pu(NO_3)_4$, with the addition at 25° to 30° C. of an excess of ammonium hydroxide, $NH_4OH$, thereby precipitating plutonium hydroxide, $Pu(OH)_4$, which is then filtered. The resultant filter cake is washed by reslurrying with distilled water and refiltered. This procedure is repeated with fresh distilled water until a filtrate having a pH of less than 7 is obtained. The washed filter cake is reslurried with sufficient distilled water to give a slurry concentration of about 0.1 molar of plutonium, and next nitric acid is added in sufficient quantity to provide a nitrate/plutonium ratio of approximately 2.5. The resultant slurry is peptized, as by stirring and heating at 50° C.; and the sol thus produced is first evaporated and then baked until the nitrate/plutonium ratio is about 0.2. Sufficient distilled water is added to the baked residue to yield a plutonium IV sol of 1 to 3 molar.

The above prior art process does not lend itself well to commercial production techniques. For example, in the baking step there is considerable difficulty in obtaining a given nitrate/plutonium ratio.

The present invention

The making of an aqueous plutonium sol according to the present invention may also proceed from an aqueous solution of plutonium nitrate, $Pu(NO_3)_4$, but which is preferred to have 0.5 molar free nitric acid, $HNO_3$. Quite differently, however, hydrogen peroxide, $H_2O_2$ (preferably 10 molar) is added to the plutonium nitrate solution; and this produces a plutonium (IV) peroxide precipitate which is subsequently filtered to produce a filter cake. The above addition was found most effective, in terms of the end result, with a $H_2O_2/Pu$ mole ratio of 30.

Next, the filter cake is washed by reslurrying with demineralized water and refiltered. This washing procedure is preferably repeated until the pH of the filtrate is equal to the pH of the fresh demineralized water. Then the washed filter cake is reslurried with sufficient demineralized water to obtain a slurry concentration of approximately 0.12 molar in plutonium. And finally the resultant slurry is peptized and concentrated to greater than 1 molar in plutonium by agitating and heating the slurry, preferably at 80° to 85° C. for about one hour. By this procedure an aqueous plutonium IV sol is conveniently produced, without a baking step, and in a manner which is well suited to commercial production.

It is a feature of the present invention that the plutonium sol is readily transformed into a gel by either of two dehydration or drying techniques. Dehydration of the sol can be accomplished either by tray evaporation, with or without heat, or by extraction of water through the use of an organic solvent such as 2-ethylhexanol. Either sol dehydration procedure, followed by calcining, produces oxide ceramic particles of requisite sizes; although tray evaporation yields chunk-like, irregularly shaped particles or shards; while the other dehydration technique yields spherically shaped particles.

It is another feature of the present invention that the plutonium IV gel thus produced can be made into dense ceramic oxide nuclear fuel material, i.e., $PuO_2$, by calcining at or below a temperature of 1200° C., thus permitting avoidance of high temperature calcining.

Still another feature of the present invention is that the plutonium sol produced according to the invention can be readily blended with other compatible aqueous sols, so that the combined sols optionally may be treated together in subsequent steps of a given method for producing a blend of two or more oxide ceramic nuclear fuel materials.

Modifications of the process

The process of the present invention has been described with particular emphasis on a method for producing plutonium sol, as applied to the making of plutonium gel and then plutonium oxide, from a plutonium nitrate solution.

In the broad sense of the invention, however, sols of other actinide materials may also be produced by forming precipitates of a salt of the actinide material by the addition of hydrogen peroxide. Then, after further steps including peptizing the precipitate to form a sol, and dehydrating the sol to make a gel of the actinide material, an oxide of the actinide material can be produced from the gel by calcining.

Furthermore, the present invention contemplates peptizing the precipitate to form a sol either by applying ultrasonic wave energy to the filter cake of the precipitate or, as mentioned previously, by agitating and heating the filtered, washed, refiltered and slurried precipitate.

Fabrication of the fuel pin

The two main processes now employed for fabricating nuclear fuel pins from oxide ceramic materials, made as aforesaid, are pelletizing and vibratory compaction. For pelletizing, the material should be a powder of sinterable grade, i.e. relatively high surface area and high density. On the other hand, for fabrication by vibratory compaction the consistency of particle sizes should be so graded as to provide maximum packed density.

One manner of obtaining particles that will give maximum packed density is by crushing formed fuel pellets and then selectively classifying and assembling the resultant particles to give the optimum mixed size gradation which minimizes voids in the compacted pin. Alternatively, particles can be obtained by the so-called "sol-gel process," instead of crushing formed fuel pellets. In this connection, a sol produced according to the invention is dehydrated by organic solvent prior to calcining to produce gelled spheres, the sizes of which are selectively controlled for optimum gradation, as by the manner of injecting droplets of the sol into the organic solvent.

The improved procedure for making an aqueous sol is thus a vital link between recovery of fissile material from spent fuel and the fabrication of fuel pins.

What is claimed is:

1. In a method of preparing an oxide nuclear fuel material, a process for preparing an aqueous sol of an actinide peroxide which is dehydratable to form an actinide peroxide gel that is calcinable at a temperature not exceeding 1200° C., and upon such calcination yields the actinide oxide product in high density form, which process comprises the steps of adding hydrogen peroxide to an aqueous solution of an actinide nitrate containing a limited concentration of free nitric acid to form a precipitate of the peroxide of said actinide, filtering said precipitate to separate same from the bulk of said solution, repeatedly washing said precipitate with water and then filtering the same until the filtrate water extracted from the precipitate has a pH substantially equal to that of the fresh wash water, adding water to the precipitate collected by the last filtering to form an aqueous slurry having a predetermined molar concentration of the actinide less than 1 molar, and then peptizing and heating said slurry to convert same into an aqueous actinide peroxide sol having a concentration of actinide greater than 1 molar.

2. The process according to claim 1 wherein said actinide is plutonium, the aqueous plutonium nitrate solution has approximately 0.5 molar free nitric acid, the hydrogen peroxide added to said solution is in the amount of approximately 10 molar and in a $H_2O_2/Pu$ mole ratio of approximately 30, said precipitate is washed with demineralized water having a pH of substantially 7, said aqueous slurry has a plutonium concentration of approximately 0.12 molar, and said peptizing step is performed at a temperature between 80° C. and 85° C. for approximately one hour.

3. The process according to claim 1 wherein said actinide is a fissile material.

4. The process according to claim 1 wherein said actinide is plutonium.

5. The process according to claim 4 wherein said plutonium nitrate solution is derived by dissolving spent nuclear fuel in nitric acid, and further including the subsequent steps of drying the sol to form a gel, and densifying the gel by calcination.

6. The process according to claim 5 wherein the drying step includes passing droplets of the sol through a dehydrating organic solvent whereby said droplets emerge from the solvent substantially in the gel stage as spheroidal particles.

7. The process according to claim 5 wherein the plutonium is quadravalent prior to the step of adding hydrogen peroxide to the plutonium nitrate solution.

8. The process according to claim 7 wherein the peptizing step includes applying ultrasonic wave energy to said precipitate.

References Cited

UNITED STATES PATENTS

| | | | |
|---|---|---|---|
| 3,024,199 | 3/1962 | Pasfield | 252—301.1 X |
| 3,035,895 | 5/1962 | McCorkle et al. | 252—301.1 X |
| 3,148,151 | 9/1964 | Fitch et al. | 252—301.1 |
| 3,164,554 | 1/1965 | Barrett et al. | 252—301.1 |
| 3,228,886 | 1/1966 | Lloyd | 252—301.1 |
| 3,262,760 | 7/1966 | Morse et al. | 252—301.1 X |
| 3,264,224 | 8/1966 | Fitch et al. | 252—301.1 |
| 3,288,717 | 11/1066 | Morse | 252—301.1 |
| 3,290,122 | 12/1966 | Clinton et al. | 23—345 |
| 3,313,602 | 4/1967 | Smith et al. | 252—301.1 X |

OTHER REFERENCES

Nuclear Science Abstracts: NSA–34287, vol. 19, No. 18, Sept. 30, 1965; NSA–42498, vol. 19, No. 22, Nov. 30, 1965; NSA–44029, vol. 19, No. 23, Dec. 15, 1965.

CARL D. QUARFORTH, *Primary Examiner.*

BENJAMIN R. PADGETT, *Examiner.*

S. J. LECHERT, JR., *Assistant Examiner.*